Patented Apr. 14, 1953

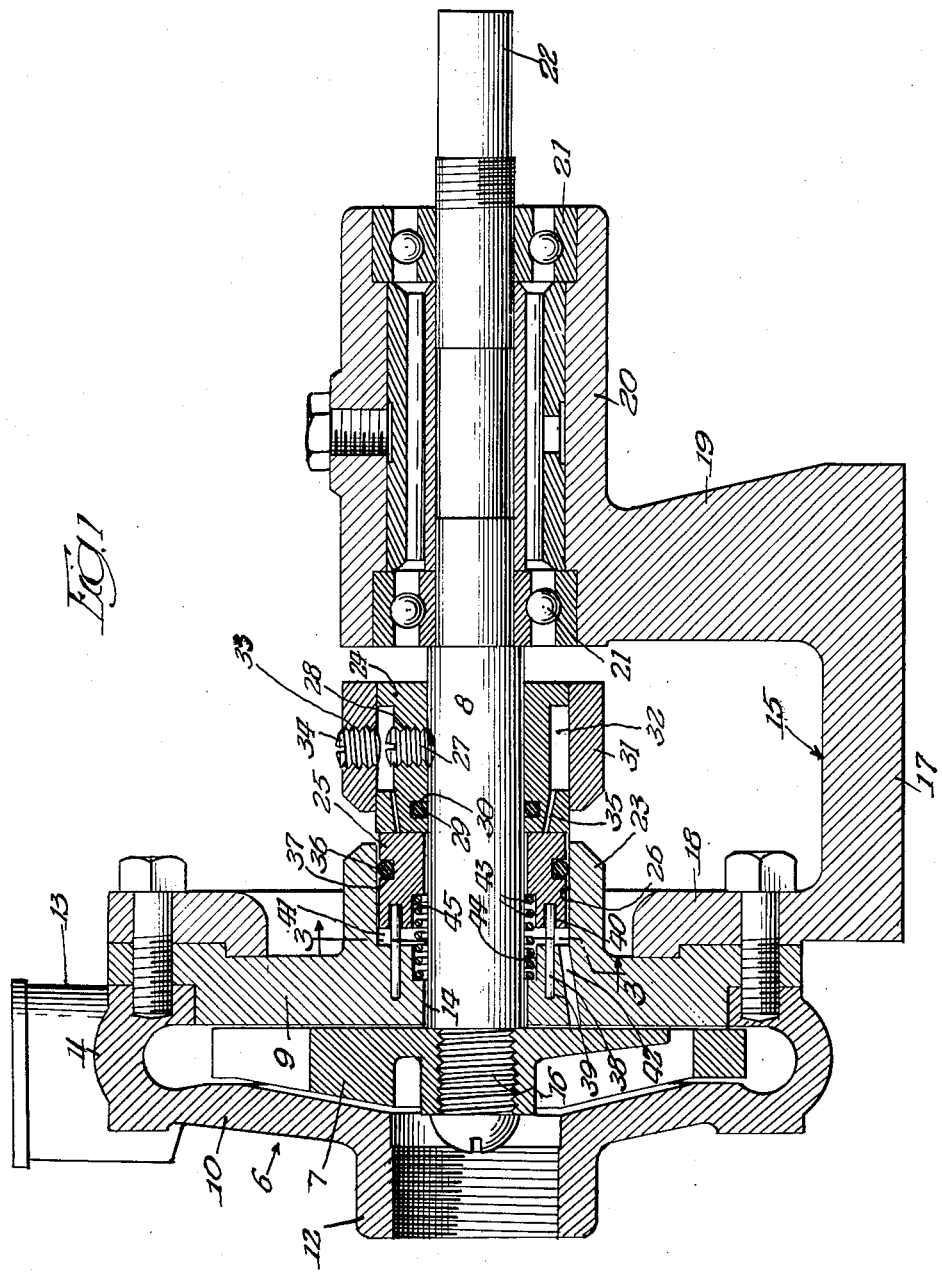

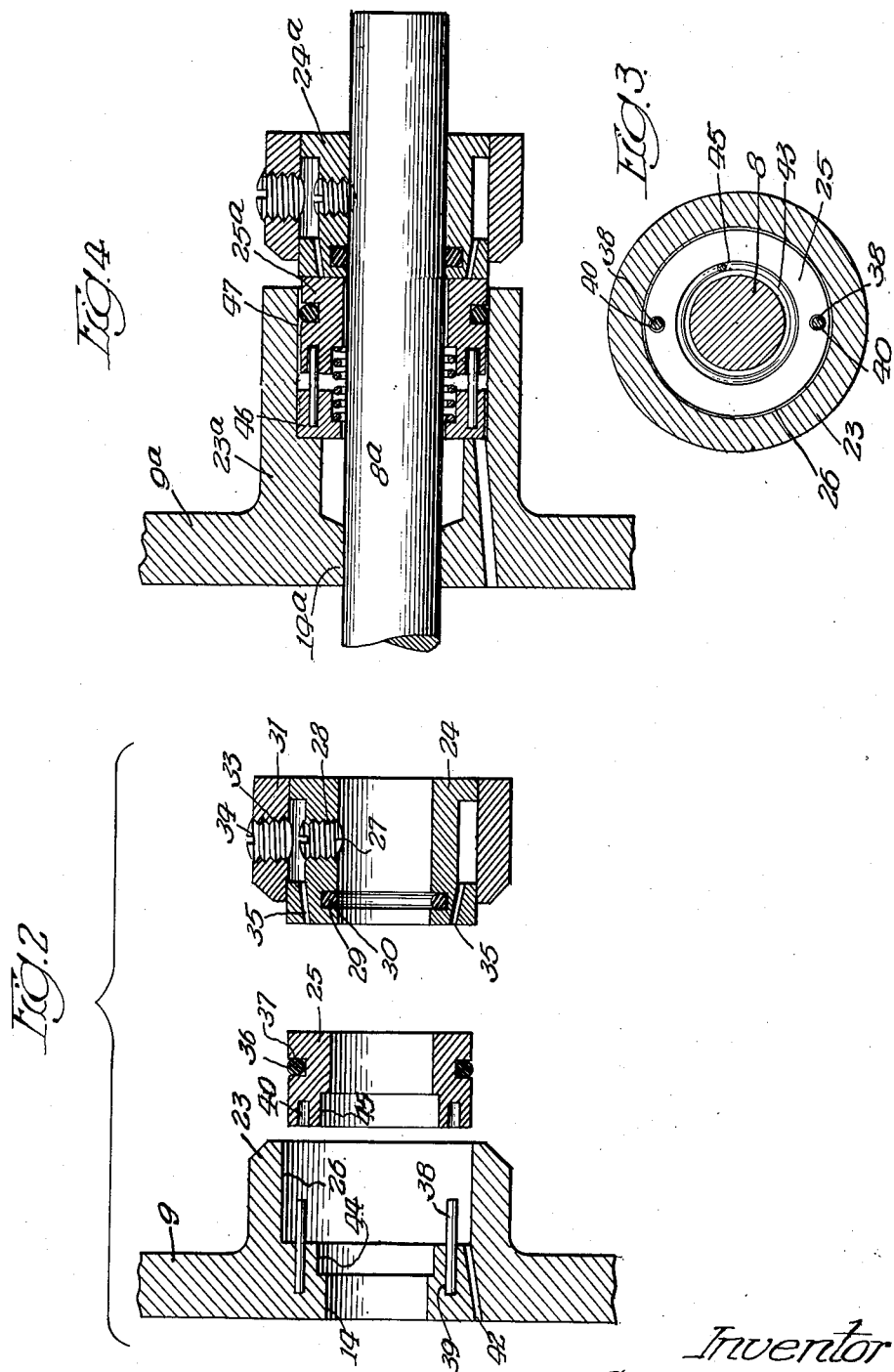

2,634,990

UNITED STATES PATENT OFFICE 2,634,990

MECHANICAL SEALING DEVICE

Charles A. Fink, Chicago, Ill.

Application July 22, 1950, Serial No. 175,400

6 Claims. (Cl. 286—11.14)

1

The present invention relates generally to mechanical sealing devices. More particularly the invention relates to that type of device which is designed for use in connection with a centrifugal pump, a rotary compressor or other unit embodying a fluid filled casing and a rotary drive shaft extending through an oversized opening in the casing, serves to prevent the fluid in the casing from leaking or flowing through the shaft opening, and as its principal components or parts comprises: (1) an annular wall which is disposed exteriorly of the casing, is connected to, and projects outwards from, the opening defining portion of the casing and has its inner periphery in the form of a bore which is of greater diameter than, and is in concentric relation with, the shaft opening; and (2) a pair of coacting ring-shaped sealing members, one of which is fixed to the shaft for drive or rotation therewith and the other of which abuts against the one member and is held against rotation with the shaft.

One object of the invention is to provide a sealing device of this type which is an improvement upon, and has certain advantages over, previously designed mechanical sealing devices of the same general construction and is characterized by extremely high efficiency, simplicity of design or construction, and a novel arrangement and mode of operation of parts.

Another object of the invention is to provide a mechanical sealing device of the aforementioned type in which the rotary ring shaped sealing member is disposed adjacent the outer end of the annular wall and has an elastic sealing ring between it and the shaft, and the stationary sealing member is mounted within the annular wall so that it is free to float or angularly adjust itself to a limited extent in order to effect self-alignment thereof with the rotary sealing member, has an elastic sealing ring between it and the annular wall and is spaced from the inner end of the wall so as to provide a pressure chamber which is in communication with the interior of the casing via the oversized shaft opening and permits the fluid under pressure that accumulates therein during drive of the shaft to exert such endwise pressure on the stationary sealing member as to cause it firmly to abut against the rotary sealing member.

Another object of the invention is to provide a mechanical sealing device of the type and character last mentioned in which the rotary ring shaped sealing member is surrounded by a fixed collar and has between it and the collar an annular well which is adapted to retain a supply of

2 any suitable lubricant and communicates with the abutting end surfaces between the rotary and stationary sealing members by way of ducts in the inner end of the rotary sealing member.

Another object of the invention is to provide a mechanical sealing device of the type and character under consideration in which the floating variety stationary sealing member within the annular wall is urged in the direction of the rotary sealing member by spring means to the end that when the drive shaft is stopped and there is hence no fluid pressure in the pressure chamber at the inner end of the stationary sealing member the seal between the abutting end surfaces of the two members is maintained.

Another object of the invention is to provide a mechanical sealing device of the character last mentioned in which the spring means is in the form of a spiral compression spring which surrounds but does not engage the shaft and has the inner end thereof disposed in an annular groove in the opening defining portion of the casing and its outer end disposed in an annular groove in the inner end of the stationary sealing member.

A further object of the invention is to provide a mechanical sealing device of the type under consideration in which the floating variety stationary sealing member within the annular wall is held against rotation relatively to the drive shaft by pins which are disposed in parallel relation with the shaft and have certain ends thereof fixedly secured within sockets in the opening defining portion of the casing and their other ends disposed loosely within sockets in the inner end of the stationary sealing member.

A still further object of the invention is to provide a mechanical sealing device which is generally of new and improved construction, possesses comparatively long life and may be manufactured and serviced at a comparatively low cost.

Other objects of the invention and the various advantages and characteristics of the present mechanical sealing device will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a vertical longitudinal section of a centrifugal pump having applied thereto a mechanical sealing device embodying the invention;

Figure 2 is a vertical longitudinal section showing in spaced apart relation the component parts of the sealing device, namely, the annular wall, the floating variety stationary sealing member and the rotary sealing member;

Figure 3 is a vertical transverse section taken on the line 3—3 of Figure 1 and showing in detail the arrangement of the pins for holding the floating variety stationary sealing member against rotation with respect to the shaft and also the arrangement and design of the spiral compression spring for urging the stationary sealing member into abutting relation with the rotary sealing member; and Figure 4 is a vertical longitudinal section showing a modified form of mechanical sealing device which is in the nature of a conversion unit and is adapted for use in connection with a centrifugal pump casing having originally a conventional stuffing box as the sealing medium for the drive shaft.

The mechanical sealing device which is shown in Figures 1 to 3, inclusive of the drawing is what may be termed a standard equipment unit and constitutes one form or embodiment of the invention. It is illustrated in connection with a conventional centrifugal pump embodying a volute casing 6, an impeller 7 and a shaft 8 for driving the impeller, and serves as hereinafter described more in detail to prevent fluid under pressure within the pump casing from leaking past the shaft 8 at the point where the latter enters the casing. The casing of the pump comprises a vertically extending rear wall 9, a substantially vertically extending front wall 10 in spaced relation with the back wall and a volute side wall 11. The front wall 10 of the casing is provided at its central portion with a tubular inlet member 12 which is adapted to be connected by a pipe or conduit (not shown) to a source of fluid that is to be pumped by the pump. The volute side wall 11 of the pump casing is connected to, and extends between, the outer marginal portions of the rear and front walls 9 and 10 and has the portion thereof that is of the greatest radius shaped to form a tangential outlet member 13. The impeller 7 is disposed within the pump casing and operates when driven by the shaft 8 to draw fluid into the central portion of the casing interior via the tubular inlet member 12 and to discharge the fluid under pressure through the tangentially extending outlet member 13 as well understood in the art. The rear wall 9 of the pump casing is provided in the central portion thereof with a circular opening 14. The shaft 8 for driving the impeller extends horizontally and it together with the pump casing 6 is supported by way of a bracket type mounting 15. One end of the shaft extends loosely through the circular opening 14 in the casing rear wall 9 and is provided with a reduced screw threaded stem 16 which fits within an internally threaded hub on the central portion of the impeller. As shown in Figure 1, the rear surface of the impeller is spaced a slight distance forwards of the inner surface of the rear wall 9 of the casing. The bracket type mounting 15 comprises a flat rectangular base 17, an upstanding ring shaped member 18 at one end of the base and a standard 19 at the other end of the base. The ring shaped member 18 fits against, and is bolted to, the outer marginal portion of the rear wall 9 of the pump casing 6. The standard 19 is provided at its upper end with a horizontally extending sleeve-like member 20 and this surrounds the outer end of the shaft 8 and carries at its ends a pair of ball bearings 21 which serve rotatably to support the shaft. The outer end of the shaft is provided with a reduced stem 22 whereby the shaft may be connected for drive by an electric motor or other prime mover (not shown). The mechanical sealing device of Figures 1, 2 and 3 is in the form of a unit and, as shown in Figure 1, surrounds the central portion of the shaft 8 and is interposed between the sleeve-like member 20 at the upper end of the standard 19 of the bracket type mounting 15 and the casing 6 of the centrifugal pump. It is essentially a sealing medium for preventing leakage of fluid under pressure from the pump casing via the shaft opening 14 and comprises an annular wall 23, a rotary ring shaped sealing member 24 and a stationary floating variety ring shaped sealing member 25.

The annular wall 23 is disposed externally of the pump casing 6 and is formed integrally with, and projects rearwards from, the portion of the casing rear wall 9 that is a small distance outwards of the shaft opening 14. The inner periphery of the annular wall 25 is in the form of a cylindrical bore 26 which is of materially greater diameter than the shaft opening 14. As shown in Figure 1, the bore 26 is arranged in concentric relation with the shaft opening 14 in the central portion of the rear wall of the pump casing. It is contemplated that so far as the mechanical sealing device of Figures 1, 2 and 3 is concerned the annular wall 23 will be of less length than the side wall of a conventional or standard stuffing box.

The ring shaped sealing member 24 extends around the drive shaft 8 and is located between the outer end of the annular wall 23 and the inner end of the sleeve-like member 20 at the upper end of the standard 19. It is formed of any suitable wear-resistant material, such, for example, as hardened stainless steel and has the inner end surface thereof, i. e., the surface that is adjacent the annular wall 23, machined, ground or lapped so that it is truly flat and extends at right angles to the axis of the shaft 8. A set screw 27 is disposed within a radially extending screw threaded hole 28 in the sealing member 24 and serves rigidly to connect the sealing member to the shaft so that it rotates conjointly therewith. The outer end of the set screw is provided with a diametric kerf in order that the set screw may be tightened or loosened by a screw driver or like turning tool. An elastic sealing ring 29 is disposed between the rotary sealing member 24 and the shaft 8 and serves to prevent fluid from flowing outwards between the sealing member and the shaft. Such ring is known commercially as an O-ring and is preferably disposed in an annular groove 30 which extends around the inner periphery of the rotary sealing member 24 and is dosposed directly inwards of the inner end of said sealing member. The dimensions of the ring are such that the ring fits snugly within the groove 30 and grips the shaft 8 with inward pressure. If the shaft 8 is sufficiently strong the elastic sealing ring 29 may be disposed in an annular groove in the shaft instead of in the internal groove 30 in the inner end of the rotary sealing member 24. Such member is surrounded by a collar 31 and has formed therein an external annular groove which constitutes a well 32 for a supply of any suitable lubricant. The collar 31 is fixedly secured to the outer periphery of the rotary sealing member 24 by a press fit and embodies a radially extending open ended screw threaded hole 33 whereby the lubricant may be introduced into the well 32. A screw plug 34 fits within, and serves normally to close, the screw threaded hole 33. Such hole is axially aligned with the screw threaded hole 28 in order that when the plug 34 is removed access may be had to the set screw 27 which, as previously pointed out, serves rigidly to connect the rotary sealing member 24 to the drive shaft 8. The well 32 communicates with the flat inner end surface of the rotary sealing member 24 by way of a plurality of ducts 35 in order that such surface is lubricated by lubricant from the well. If the fluid that is pumped by the centrifugal pump has a lubricant therein or has lubricating properties the collar 31, the well 32 and the ducts 35 may be eliminated.

The floating variety stationary ring shaped sealing member 25 fits loosely within the annular wall 23 and extends loosely around the shaft 8 as shown in Figure 1 of the drawings. It is maintained in sealed relation with the bore 26 in the annular wall 23 by way of an elastic sealing ring 36 and has the outer end surface thereof in abutting relation with the inner end surface of the rotary ring shaped sealing member 24. Such outer end surface of the floating variety ring shaped sealing member 25 is machined, ground or lapped in order that it is truly flat. The sealing member 25 is formed of any suitable anti-friction material, such, for example, as molded self-lubricating carbon. The elastic sealing ring 36 serves to prevent leakage of fluid between the stationary sealing member 25 and the bore 26 and is preferably disposed within an external annular groove 37 in the central portion of the stationary sealing member 25. It is the same in construction and mode of operation as the sealing ring 39 between the rotary sealing member 24 and the shaft 8 and is so proportioned or dimensioned that it fits snugly within the groove 37 and grips with outward pressure the inner periphery of the annular wall 23. The sealing member 25 is held against rotation with the shaft 8 by way of a plurality of horizontally extending pins 38. Such pins are disposed in parallel relation with the shaft 8 and have the inner ends thereof, i. e., the ends thereof that are remote from the sealing member 25, fitting snugly within sockets 39 in the central opening defining portion of the rear wall 9 of the pump casing 6. Preferably such ends of the pins 38 are secured in place by way of a drive or press fit. The other or outer ends of the pins fit loosely within sockets 40 in the inner end of the ring shaped sealing member 25 in order that such member is free to float or angularly adjust itself to a limited extent to the end that it effects self-alignment thereof with the rotary sealing member 24. The inner end of the floating variety stationary sealing member 25 is spaced from the opening defining portion of the casing rear wall 9 in order to provide a pressure chamber 41. Such chamber communicates with the interior of the pump casing 6 via the over-sized shaft opening 14 and permits the fluid under pressure that accumulates therein during drive of the shaft to exert such endwise pressure on the sealing member 25 as to cause the latter firmly to abut against the rotary sealing member 24. The pressure of the fluid in the pressure chamber 41 corresponds to the pressure of the fluid in the pump casing and hence as the pressure in the pump casing increases due to increased speed of drive of the shaft 8 the pressure of the fluid in the pressure chamber correspondingly increases with the result that the floating variety stationary sealing member 25 is urged with greater pressure into sealing or abutting relation with the rotary sealing member 24. The lower portion of the pressure chamber 41 communicates with the interior of the pump casing by way of a downwardly and inwardly inclined duct 42. The latter is formed in the rear wall 9 of the casing of the pump and has a twofold purpose in that it assists the over-sized shaft opening 14 in admitting fluid under pressure into the pressure chamber and also permits the fluid in the pressure chamber to drain back into the pump casing interior when the pump is stopped. The float variety stationary sealing member 25 is urged in the direction of the rotary sealing member 24 by way of a spiral compression spring 43 to the end that when the drive shaft 8 is stopped and there is hence no fluid under pressure in the pressure chamber 41 the seal between the abutting end surfaces of the two sealing members is maintained. This spring surrounds, but does not engage, the shaft 8 and has the inner end thereof disposed in an annular groove 44 in the opening defining portion of the rear wall 9 of the pump casing 6. The outer end of the spring 43 is disposed within an internal annular groove 45 in the inner end of the floating variety stationary sealing member 25. By reason of the fact that the spring does not engage the shaft 8 it does not turn or revolve with such shaft.

When the pump is in operation as the result of drive of the shaft 8 the sealing member 24 revolves or rotates with the shaft and, by reason of the sealed relation between its flat inner end surface and the outer end surface of the stationary sealing member, coacts with the latter member to prevent leakage of fluid along the shaft. The sealing ring 29 prevents leakage of fluid between the rotary sealing member 24 and the shaft 8. The stationary sealing member 25 is maintained in sealed relation with the rotary sealing member by the pressure of the fluid in the pressure chamber and also the action of the compression spring 45. The sealing ring 36 in the groove 37 prevents leakage of fluid between the floating variety stationary sealing member 25 and the annular wall 23. In connection with drive of the shaft 8 lubricant flows from the well 32 through the ducts 35 onto the abutting end surfaces of the two sealing members.

The aforementioned mechanical sealing device is essentially simple in design and is characterized by extremely high efficiency. It is capable of being produced at a comparatively low cost and also assembled and dismantled with facility. It is contemplated that the sealing device of Figures 1, 2 and 3 will be supplied as standard equipment with the pump with which it is associated.

The mechanical sealing device of Figure 4 is in the nature of a replacement or reconversion unit on a centrifugal pump which was originally furnished or supplied with a conventional or standard stuffing box comprising an annular wall, packing within the wall and a screw threaded follower. In Figure 4 the rear wall of the pump casing is designated by the reference numeral 9a, the drive shaft for the pump is designated by the reference numeral 8a and the annular wall of the stuffing box is designated by the reference numeral 23a. The rear wall 9a of the pump casing embodies in its central portion an over-sized opening 14a through which the drive shaft 8a extends into the interior of the pump casing. The device of Figure 4 comprises a rotary ring shaped sealing member 24a and a coacting floating variety stationary ring shaped sealing member 25a and is the same in design and mode of operation as the sealing device of Figures 1, 2 and 3 except that it includes as an additional part an adaptor ring 46 in which are mounted the inner ends of the pins for holding the sealing member 25a against rotation with the drive shaft 8a. In installing the mechanical sealing device of Figure 4 the screw threaded follower and packing of the conventional stuffing box are first removed from the annular wall 23a. Thereafter such annular wall is milled or drilled to form a counter-bore 47 which is of sufficient depth to accommodate the adaptor ring 46 and the floating variety stationary sealing member 25a. After formation of the counter-bore 47 the adaptor ring 46 with the pins thereon is driven into the rear end of the counter-bore until it is fixedly seated in the inner end thereof. As shown in Figure 4 the adaptor ring 46 surrounds loosely the drive shaft 8a and has an internal annular groove for the inner end of the spiral compression spring that serves to urge the float variety stationary sealing member 25a into abutment or sealed relation with the rotary sealing member 24a. After mounting of the adaptor ring 46 in place the two sealing members are mounted and assembled as shown in Figure 4.

Whereas the mechanical sealing device has been described and illustrated in connection with a centrifugal pump it is to be understood that it may be used in connection with a rotary compressor, a rotary agitator, a rotary mixer or any other unit embodying a fluid filled casing and a rotary drive shaft extending into the casing. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A mechanical sealing device designed for use with a fluid pressure filled casing and a rotary shaft extending through an over-sized opening in the casing, adapted to prevent leakage of fluid from the casing along the shaft, and comprising an externally disposed annular wall of uniform internal diameter from end to end and of greater internal diameter than the opening, extending concentrically around the shaft, and connected to, and extending outwards from, the casing, a first ring shaped sealing member disposed adjacent the outer end of the annular wall, extending around, and connected to rotate with, the shaft, having an internal annular groove intermediate its ends with a shaft encircling and gripping elastic sealing ring therein, and embodying a smooth inner end surface, a coacting second ring shaped sealing member fitting loosely within the annular wall and around the shaft, embodying a smooth outer end surface in abutment with the smooth inner end surface of the first sealing member, having an external annular groove intermediate its ends with a wall engaging and gripping elastic sealing ring therein, embodying a plurality of spaced apart longitudinally extending sockets in its inner end portion, provided with means in the form of a plurality of pins around and in parallel relation with the shaft and with certain ends thereof anchored in the opening defining portion of the casing and their other ends fitting loosely in said sockets, for holding it against rotation with the shaft while at the same time permitting it to float to a limited extent in order to permit self-alignment thereof with the first sealing member, and having its inner end spaced from the inner end of said annular wall in order to form a pressure chamber which communicates with the casing interior via the shaft opening and permits the fluid under pressure that accumulates therein to exert endwise pressure on the second sealing member in the direction of said first sealing member, and a single spiral compression spring extending around, but out of engagement with, the shaft, located directly inside of the pins, having one end thereof in direct abutment with said opening defining portion of the casing and its other end in abutment with the inner end of the second sealing member, and adapted to exert a substantially constant outward force on the second sealing member in order to maintain it in abutting relation with the first sealing member when there is no fluid under pressure in said pressure chamber.

2. A mechanical sealing device designed for use with a casing normally filled with fluid under pressure and a rotary horizontal shaft extending through an over-sized opening in the casing, adapted to prevent leakage of fluid from the casing along the shaft, and comprising an externally disposed annular wall of greater internal diameter than the opening, extending concentrically around the shaft, and connected to, and extending outwards from, the casing, a first ring shaped sealing member disposed adjacent the outer end of the annular wall, extending around, and connected to rotate with, the shaft, having an internal annular groove intermediate its ends with a shaft encircling and gripping elastic sealing ring therein, and embodying a smooth inner end surface, a coacting second ring shaped sealing member fitting loosely within the annular wall and around the shaft, embodying a smooth outer end surface in abutment with the smooth inner end surface of the first sealing member, having an external annular groove intermediate its ends with a wall engaging and gripping elastic sealing ring therein, provided with pin and socket connections for holding it against rotation with the shaft while at the same time permitting it to float to a limited extent in order to permit self-alignment thereof with the first sealing member, and having its inner end spaced from the inner end of said annular wall in order to form a pressure chamber which communicates with the casing interior via the shaft opening and permits the fluid under pressure that accumulates therein to exert endwise pressure on the second sealing member in the direction of said first sealing member, a single spiral compression spring extending around, but out of engagement with, the shaft, having one end thereof in abutment with the opening defining portion of the casing and its other end in abutment with the inner end of the second sealing member, and adapted to exert a substantially constant outward force on the second sealing member in order to maintain it in abutting relation with the first sealing member when there is no fluid under pressure in said pressure chamber, and means forming a duct which leads downwards from the lower inner portion of the pressure chamber to the casing interior and serves to assist the shaft opening in delivering fluid under pressure to the chamber when the casing is filled with fluid under pressure and to drain fluid from the chamber when no fluid under pressure exists in the casing.

3. A mechanical sealing device designed for use with a fluid pressure filled casing and a rotary shaft extending into the casing, adapted to prevent leakage of fluid from the casing along the shaft, and comprising an annular wall of materially greater internal diameter than the diameter of the shaft, positioned concentrically around the shaft, extending outwards from, and in fixed relation with, the casing, and having at the inner end thereof means forming a crosswall with an over-sized opening around the shaft and in communication with the casing interior, a first ring shaped sealing member disposed adjacent the outer end of the annular wall, extending around, and connected to rotate with, the shaft, having an internal annular groove intermediate its ends with a shaft encircling and gripping elastic sealing ring therein, and embodying a smooth inner end surface, a coacting second ring shaped sealing member fitting loosely within the annular wall and around the shaft, embodying a smooth outer end surface in abutment with the smooth inner end surface of the first sealing member, provided with an external annular groove intermediate its ends, provided within said external annular groove with an elastic sealing ring in firm gripping engagement with the inner periphery of the annular wall, embodying a plurality of spaced apart longitudinally extending sockets in its inner end portion, and having its inner end spaced from the crosswall in order to form a pressure chamber which communicates with the casing interior via said over-sized opening and permits the fluid under pressure that accumulates therein to exert endwise pressure on the second sealing member in the direction of the first sealing member, a plurality of pins disposed within the annular wall, extending around, and in parallel relation with, the shaft, having the inner ends thereof anchored to said crosswall and their other ends fitting loosely in said sockets, and serving to hold the second sealing member against rotation with the shaft while at the same time permitting it to float to a limited extent in order to permit self-alignment thereof with the first sealing member, and a single spiral compression spring extending around, but out of engagement with, the shaft, located directly inside of the pins, having one end thereof in abutment with the crosswall and its other end in abutment with the inner end of the second sealing member, and adapted to exert a substantially constant outward force on the second sealing member in order to maintain it in abutment with the first sealing member when there is no fluid under pressure in said pressure chamber.

4. A mechanical sealing device designed for use with a fluid pressure filled casing and a rotary shaft extending into the casing, adapted to prevent leakage of fluid from the casing along the shaft, and comprising an annular wall of materially greater internal diameter than the diameter of the shaft, positioned concentrically around the shaft, extending outwards from, and in fixed relation with, the casing, and having at the inner end thereof means forming a crosswall with an over-sized opening around the shaft and in communication with the casing interior, a first ring shaped sealing member disposed adjacent the outer end of the annular wall, extending around, and connected to rotate with, the shaft, having an internal annular groove intermediate its ends with a shaft encircling and gripping elastic sealing ring therein, and embodying a smooth inner end surface, a coacting second ring shaped sealing member fitting loosely within the annular wall and around the shaft, embodying a smooth outer end surface in abutment with the smooth inner end surface of the first sealing member, having an elastic sealing ring between it and the inner periphery of the annular wall, and having its inner end spaced from the crosswall in order to form a pressure chamber which communicates with the casing interior via said over-sized opening and permits the fluid under pressure that accumulates therein to exert endwise pressure on the second sealing member in the direction of the first sealing member, pin and socket connections between one of the walls and the inner portion of the second sealing member for holding said second sealing member against rotation with the shaft while at the same time permitting it to float to a limited extent in order to permit self-alignment thereof with the first sealing member, and a single spiral compression spring extending around, but out of engagement with, the shaft, having one end thereof in direct abutment with the crosswall and its other end in direct abutment with the inner end of the second sealing member, and adapted to exert a substantially constant outward force on said second sealing member in order to maintain it in abutment with the first sealing member when there is no fluid under pressure in said pressure chamber.

5. A mechanical sealing device designed for use with a fluid pressure filled casing and a rotary shaft extending into the casing, adapted to prevent leakage of fluid from the casing along the shaft, and comprising an annular wall of materially greater internal diameter than the diameter of the shaft, positioned concentrically around the shaft, extending outwards from, and in fixed relation with, the casing, and having at the inner end thereof means forming a crosswall with an over-sized opening around the shaft and in communication with the casing interior, a first ring shaped sealing member disposed adjacent the outer end of the annular wall, extending around, and connected to rotate with, the shaft, provided with an elastic sealing ring between it and the shaft, embodying a smooth inner end surface, having intermediate its ends an external annular groove forming a well for lubricant, and also having a lubricant duct between the well and its smooth inner end surface, a collar extending around, and fixedly secured to, the first sealing members, serving as a closure for the outer portion of the well, and provided with a plug closed hole for introducing lubricant into said well, a coacting second ring shaped sealing member fitting loosely within the annular wall and around the shaft, embodying a smooth outer end surface in abutment with the smooth inner end surface of the first sealing member, having an elastic sealing ring between it and the inner periphery of the annular wall, and having its inner end spaced from the crosswall in order to form a pressure chamber which communicates with the casing interior via said over-sized opening and permits the fluid under pressure that accumulates therein to exert endwise pressure on the second sealing member in the direction of the first sealing member, pin and socket connections between one of the walls and the inner portion of the second sealing member for holding said second sealing member against rotation with the shaft while at the same time permitting it to float to a limited extent in order to permit self-alignment thereof with the first sealing member, and a single spiral compression spring extending around, but out of engagement with, the shaft, having one end thereof in direct abutment with the crosswall and its other end in direct abutment with the inner end of the second sealing member, and adapted to exert a substantially constant outward force on said second sealing member in order to maintain it in abutment with the first sealing member when there is no fluid under pressure in said pressure chamber.

6. A mechanical sealing device designed for use with a fluid pressure filled casing and a rotary shaft extending into the casing, adapted to prevent leakage of fluid from the casing along the shaft, and comprising an annular wall of materially greater internal diameter than the diameter of the shaft, positioned concentrically around the shaft, extending outwards from, and in fixed relation with, the casing, and having at the inner end thereof means forming a crosswall with an over-sized opening around the shaft and in communication with the casing interior, a first ring shaped sealing member disposed adjacent the outer end of the annular wall, extending around, and connected to rotate with, the shaft, having an internal annular groove intermediate its ends with a shaft encircling and gripping elastic sealing ring therein, and embodying a smooth inner end surface, a coacting second ring shaped sealing member fitting loosely within the annular wall and around the shaft, embodying a smooth outer end surface in abutment with the smooth inner end surface of the first sealing member, having an elastic sealing ring between it and the inner periphery of the annular wall, and having its inner end spaced from the crosswall in order to form a pressure chamber which communicates with the casing interior via said oversized opening and permits the fluid under pressure that accumulates therein to exert endwise pressure on the second sealing member in the direction of the first sealing member, pin and socket connections between one of the walls and the inner portion of the second sealing member for holding said second sealing member against rotation with the shaft while at the same time permitting it to float to a limited extent in order to permit self-alignment thereof with the first sealing member, a single spiral compression spring extending around, but out of engagement with, the shaft, having one end thereof in direct abutment with the crosswall and its other end in direct abutment with the inner end of the second sealing member, and adapted to exert a substantially constant outward force on said second sealing member in order to maintain it in abutment with the first sealing member when there is no fluid under pressure in said pressure chamber, and means forming a duct which leads downwards from the lower inner portion of the pressure chamber to the casing interior and serves to assist said oversized opening in delivering fluid under pressure to the chamber when the casing is filled with fluid under pressure and to drain fluid from the chamber when no fluid under pressure exists in the casing.

CHARLES A. FINK.

References Cited in the file of this patent

UNITED STATES PATENTS

| Number | Name | Date |
|---|---|---|
| 1,167,210 | Orr | Jan. 4, 1916 |
| 1,927,543 | Doyle | Sept. 19, 1933 |
| 2,023,206 | Olson | Dec. 3, 1935 |
| 2,365,046 | Bottomley | Dec. 12, 1944 |
| 2,383,862 | Hornschuch | Aug. 28, 1945 |
| 2,405,464 | Storer, Jr. | Aug. 6, 1946 |
| 2,434,458 | Curry | Jan. 13, 1948 |
| 2,479,711 | Artunoff | Aug. 23, 1949 |